US007904366B2

(12) United States Patent  
Pogust (10) Patent No.: US 7,904,366 B2
(45) Date of Patent: Mar. 8, 2011

(54) METHOD AND SYSTEM TO DETERMINE RESIDENT QUALIFICATIONS (75) Inventor: Wende Pogust, Millwood, NY (US)

(73) Assignee: General Electric Capital Corporation, Stamford, CT (US)

(*) Notice: Subject to any disclaimer, the term of this patent is extended or adjusted under 35 U.S.C. 154(b) by 697 days.

(21) Appl. No.: 11/219,188

(22) Filed: Sep. 2, 2005

(65) Prior Publication Data
US 2007/0055618 A1    Mar. 8, 2007

(51) Int. Cl.
G06Q 40/00    (2006.01)
(52) U.S. Cl. ...................................... 705/36 R
(58) Field of Classification Search ............ None
See application file for complete search history.

(56) References Cited

U.S. PATENT DOCUMENTS

| | | | | |
|---|---|---|---|---|
| 5,680,305 A * | 10/1997 | Apgar, IV | ................ | 705/10 |
| 5,948,040 A * | 9/1999 | DeLorme et al. | ............ | 701/201 |
| 6,023,687 A * | 2/2000 | Weatherly et al. | ............ | 705/38 |
| 6,049,784 A * | 4/2000 | Weatherly et al. | ............ | 705/38 |
| 6,088,686 A * | 7/2000 | Walker et al. | ............ | 705/38 |
| 7,107,239 B2 * | 9/2006 | Graff | ............ | 705/36 R |
| 7,152,037 B2 * | 12/2006 | Smith | ............ | 705/1 |
| 7,254,559 B2 * | 8/2007 | Florance et al. | ............ | 705/51 |
| 7,287,008 B1 * | 10/2007 | Mahoney et al. | ............ | 705/38 |
| 7,464,109 B2 * | 12/2008 | Modi | ............ | 1/1 |
| 7,533,046 B2 * | 5/2009 | Blanz et al. | ............ | 705/35 |
| 2002/0107764 A1 * | 8/2002 | McCoy | ............ | 705/30 |
| 2003/0093289 A1 * | 5/2003 | Thornley et al. | ............ | 705/1 |
| 2003/0144945 A1 * | 7/2003 | Opsahl-Ong et al. | ............ | 705/37 |
| 2003/0208362 A1 * | 11/2003 | Enthoven et al. | ............ | 705/1 |
| 2004/0128230 A1 * | 7/2004 | Oppenheimer et al. | ............ | 705/38 |
| 2005/0177448 A1 * | 8/2005 | Fu et al. | ............ | 705/26 |
| 2005/0177488 A1 * | 8/2005 | Rexrode | ............ | 705/38 |
| 2005/0222861 A1 * | 10/2005 | Silverman et al. | ............ | 705/1 |
| 2006/0161482 A1 * | 7/2006 | Jacobson et al. | ............ | 705/26 |
| 2006/0184440 A1 * | 8/2006 | Britti et al. | ............ | 705/35 |
| 2006/0190279 A1 * | 8/2006 | Heflin | ............ | 705/1 |
| 2006/0212386 A1 * | 9/2006 | Willey et al. | ............ | 705/38 |
| 2006/0277077 A1 * | 12/2006 | Coleman | ............ | 705/4 |
| 2007/0043654 A1 * | 2/2007 | Libman | ............ | 705/38 |
| 2007/0162332 A1 * | 7/2007 | Helm | ............ | 705/14 |

OTHER PUBLICATIONS

Weeding Out Prospects Fernandez, Kim Units, v25, n6, p. 28 Jul. 2001.*
The Art of Finding the Right Tenant Richard Magnone 1999.*
Preparing community associations for the twenty-first century: Anticipating the legal problems and possible solutions Rohan, Patrick K. St. John's Law Review V73n1, pp. 3-42 Winter 1999.*

* cited by examiner

Primary Examiner — Alexander Kalinowski
Assistant Examiner — Bruce I Ebersman
(74) Attorney, Agent, or Firm — Buckley, Maschoff & Talwalkar LLC (57) ABSTRACT A system, method, apparatus, and computer program code, including obtaining a record of actual rental payments associated with residents of a portfolio of rental units corresponding to a rental unit; obtaining a credit rating for the residents of the portfolio of rental units; classifying the residents of the portfolio of rental units into at least one category based on the record of actual rental payments; and determining, by statistical analysis, a predictive indicator of a credit rating to associate with the at least one category based on the credit rating and the classification of the residents.

17 Claims, 6 Drawing Sheets

```
┌─────────────────────────────────────┐
│ OBTAIN A RECORD OF ACTUAL RENTAL    │
│ PAYMENTS ASSOCIATED WITH RESIDENTS  │
│ OF A PORTFOLIO OF RENTAL UNITS      │
│ CORRESPONDING TO A RENTAL UNIT      │
│                                 505 │
└─────────────────┬───────────────────┘
                  │
┌─────────────────┴───────────────────┐
│ OBTAIN A CREDIT RATING FOR THE      │
│ RESIDENTS OF THE PORTFOLIO OF       │
│ RENTAL UNITS                        │
│                                 510 │
└─────────────────┬───────────────────┘
                  │
┌─────────────────┴───────────────────┐
│ CLASSIFY THE RESIDENTS OF THE       │
│ PORTFOLIO OF RENTAL UNITS INTO AT   │
│ LEAST ONE CATEGORY BASED ON THE     │
│ RECORD OF ACTUAL RENTAL PAYMENTS 515│
└─────────────────┬───────────────────┘
                  │
┌─────────────────┴───────────────────┐
│ DETERMINE, BY STATISTICAL ANALYSIS, │
│ A PREDICTIVE INDICATOR OF A CREDIT  │
│ RATING TO ASSOCIATE WITH THE AT     │
│ LEAST ONE CATEGORY BASED ON         │
│ THE CREDIT RATING AND THE           │
│ CLASSIFICATION OF THE RESIDENTS 520 │
└─────────────────────────────────────┘
```

OBTAIN A RECORD OF ACTUAL RENTAL PAYMENTS ASSOCIATED WITH RESIDENTS OF A PORTFOLIO OF RENTAL UNITS CORRESPONDING TO A RENTAL UNIT
605

OBTAIN A CREDIT RATING FOR THE RESIDENTS OF THE PORTFOLIO OF RENTAL UNITS
610

CLASSIFY THE RESIDENTS OF THE PORTFOLIO OF RENTAL UNITS INTO AT LEAST ONE CATEGORY BASED ON THE RECORD OF ACTUAL RENTAL PAYMENTS
615

DETERMINE, BY STATISTICAL ANALYSIS, A PREDICTIVE INDICATOR OF A CREDIT RATING TO ASSOCIATE WITH THE AT LEAST ONE CATEGORY BASED ON THE CREDIT RATING AND THE CLASSIFICATION OF THE RESIDENTS
620

OBTAIN AN ACCEPTABLE RISK LEVEL REGARDING PAYMENT OF RENT FOR THE RENTAL UNIT
625

PROVIDE AN INDICATION THAT A RENTAL APPLICANT APPLYING TO RENT THE RENTAL UNIT AND HAVING A GIVEN CREDIT RATING WILL CORRESPOND TO THE AT LEAST ONE CATEGORY, BASED ON THE ACCEPTABLE RISK LEVEL AND THE DETERMINED PREDICTIVE INDICATOR
630

FIG. 6

METHOD AND SYSTEM TO DETERMINE RESIDENT QUALIFICATIONS

FIELD OF THE INVENTION

The present disclosure relates to a predictive indicator. In some embodiments herein, the present disclosure relates a method, apparatus, and article for determining a predictive indicator for facilitating a determination and an indication of a qualified rental applicant regarding a real estate rental application.

BACKGROUND OF THE INVENTION

Real estate rental property may be owned and managed as an investment. As such, an effort may be made to maximize a value and return on investment for the real estate property. A number of factors may impact the value and return on investment for a real estate rental property including, for example, maintenance costs, vacancies, debt service, and unpaid rental payments. Unpaid rental payments may decrease the value of the property and the return on investment.

Thus, there may be a need to determine, provide an indication of, and communicate a qualification regarding a real estate rental. Accordingly, there exists a need to efficiently determine a predictive indicator regarding a real estate rental unit and associated rental payments.

SUMMARY OF THE INVENTION

Some embodiments of the present disclosure provide a system, method, apparatus, means, and article for facilitating determination of a qualification of a real estate rental applicant regarding a real estate rental property. A method for determining a predictive indicator of a credit rating to associate with a category of real estate renters may include, in some embodiments, obtaining a record of actual rental payments associated with residents of a portfolio of rental units corresponding to a rental unit; obtaining a credit rating for the residents of the portfolio of rental units; classifying the residents of the portfolio of rental units into at least one category based on the record of actual rental payments; and determining, by statistical analysis, a predictive indicator of a credit rating to associate with the at least one category based on the credit rating and the classification of the residents. The statistical analysis may include a logical linear regression operation and other statistical analysis operations.

In some embodiments, the method may further include obtaining an acceptable risk level regarding payment of rent for the rental unit and providing an indication that a rental applicant applying to rent the rental unit and having a given credit rating will correspond to the at least one category, based on the acceptable risk level and the determined predictive indicator. Further, the provided indication regarding the rental applicant may be expressed as a probability.

In some embodiments, the acceptable risk level may be varied. Further still, the acceptable risk level may be varied independent of the predictive indicator.

In some aspects herein, the method may include determining a qualification for the rental applicant by comparing a credit rating of the rental applicant and the determined predictive indicator. The qualification for the rental applicant may comprise a plurality of levels of qualification and each level of qualification may correspond to a one of the at least one categories.

The indication of whether the rental applicant is qualified may be communicated to a system, apparatus, network, etc. using a variety of communication systems, devices, protocols, and techniques.

In some embodiments, the portfolio of rental units corresponding to the rental unit includes rental units owned and/or managed by a common entity and similar in some aspects to the subject rental unit (e.g., comparable location, rental price, and/or lease term, and other factors).

In some embodiments, a system for facilitating a determination of a qualification of a rental applicant is provided. The system may include a memory and a processor connected to the memory in, for example a stand alone or networked device. The processor may execute certain aspects of the methods discussed herein. For example, the processor may be operative to obtain a record of actual rental payments associated with residents of a portfolio of rental units corresponding to a rental unit; obtain a credit rating for the residents of the portfolio of rental units; classify the residents of the portfolio of rental units into at least one category based on the record of actual rental payments; and determine, by statistical analysis, a predictive indicator of a credit rating to associate with the at least one category based on the credit rating and the classification of the residents.

In some embodiments of the present disclosure, a storage medium having executable programming instructions stored thereon may be provided. The instructions on the storage medium may be executed by a machine (e.g., computer, processor, server, etc.) to invoke, for example, some of the methods herein using some of the systems discussed herein. The instructions on the storage medium may include instructions to obtain a record of actual rental payments associated with residents of a portfolio of rental units corresponding to a rental unit; instructions to obtain a credit rating for the residents of the portfolio of rental units; instructions to classify the residents of the portfolio of rental units into at least one category based on the record of actual rental payments; and instructions to determine, by statistical analysis, a predictive indicator of a credit rating to associate with the at least one category based on the credit rating and the classification of the residents.

It should be appreciated that the storage medium discussed herein may be used with methods and systems in combination with, in addition to, and/or in lieu of the methods and systems explicitly disclosed herein.

Additional objects, advantages, and novel features of the invention shall be set forth in part in the description that follows, and in part will become apparent to those skilled in the art upon examination of the following or may be learned by the practice of the invention.

BRIEF DESCRIPTION OF THE DRAWINGS

The accompanying drawings, which are incorporated herein and form a part of the specification, illustrate some embodiments of the present disclosure, and together with the descriptions herein serve to explain the principles thereof.

DETAILED DESCRIPTION

Applicant has recognized that there is a need for systems, means, computer code and methods that facilitate determination of the qualifications of a rental applicant applying to rent, lease, or otherwise become responsible for payments of, for example, a rental property. The rental property may be a real estate property such as a commercial building or suite, a residential apartment, and other categories and types of real estate.

It should be appreciated that a real estate rental unit herein may include a variety of types and categories of real estate properties. It should further be appreciated and understood that the variety of types and categories of real estate properties now known and defined by those skilled in the relevant arts and those that may become known and/or defined in the future are considered by the use of the term rental unit herein.

In particular, applicant has recognized that there is a need for systems, means, computer code and methods to determine a predictive indicator to facilitate the determination of a qualification of a real estate rental applicant prior to renting a rental unit to the rental applicant, in an efficient and reliable manner. One technical effect obtained by such systems, methods, etc. is that information regarding the qualifications of the rental applicant may be provided prior to other, perhaps extensive, time and resources are allocated in anticipation and/or reliance on the rental applicant being qualified to rent the rental unit. Another technical effect may include a method, a system, and a storage medium that provides a mechanism to facilitate predicting whether a real estate rental applicant will satisfy rental payments in a timely manner. These and other features will be discussed in further detail below, by describing a system, individual devices, and processes according to embodiments of the present disclosure.

Figure 1:
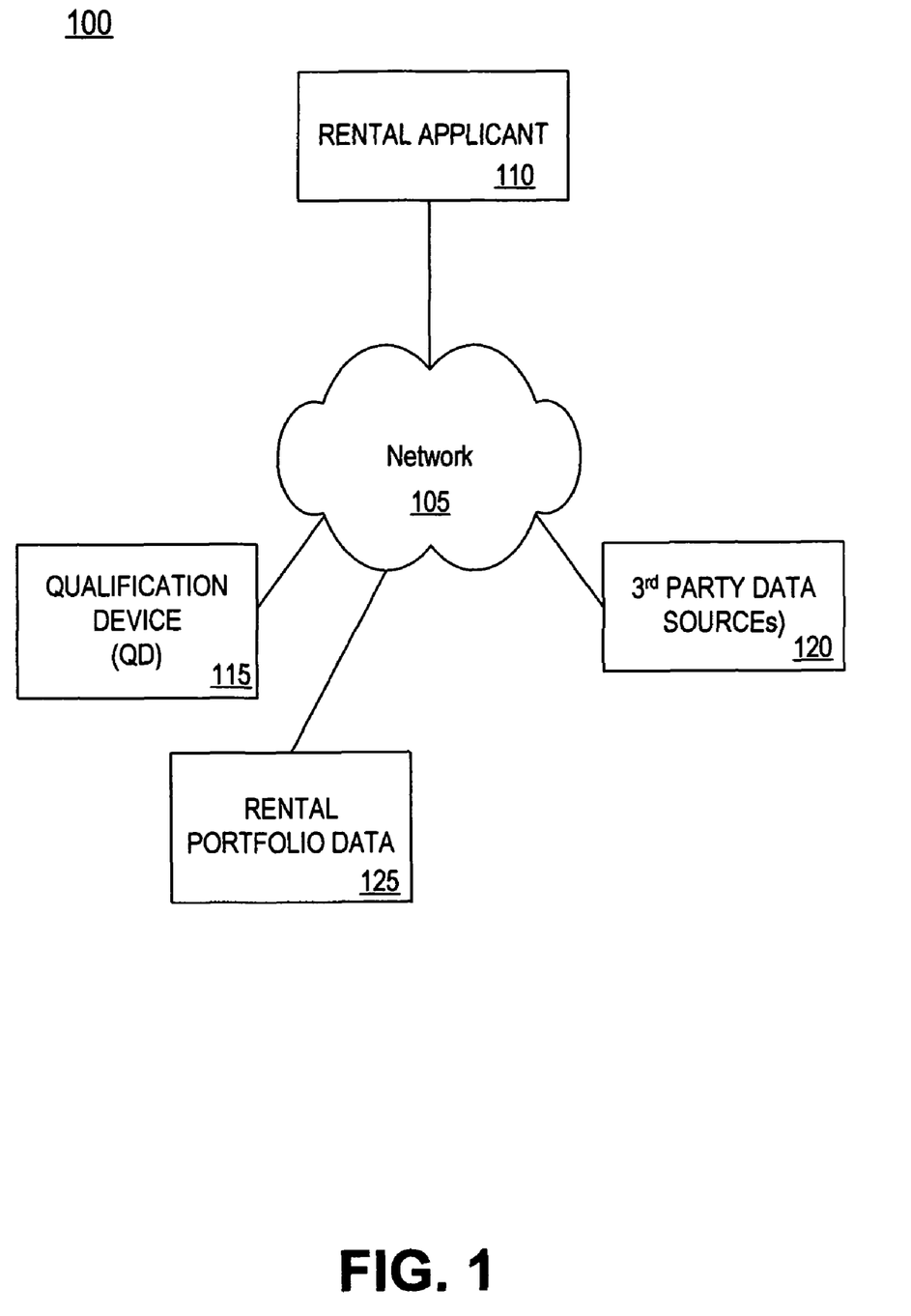
FIG. 1 is an exemplary block diagram illustrating a system environment for some embodiments herein.

Referring to FIG. 1, an exemplary system 100 depicting a context or environment suitable for some embodiments herein is illustrated. System 100 includes a qualification device, QD, 115 that may be in communication with other devices and systems via a network 105. Network 105 and parts thereof may be a publicly accessible network or a secure network including the Internet, an intranet, and other communication networks (e.g., telephone systems). System 100 may further be in communication with or accessible to a rental applicant 110. Rental applicant 110 may desire to rent a real estate rental unit (e.g., a house, apartment, store front, cottage, etc.). Rental applicant 110 may be in communication with QD 115 may be in communication or interfaced with a number of information providers such as, for example, leasing agents, credit bureaus, housing court record keepers, payroll companies, and third party data sources 120. Third party data sources 120 may provide a variety of information related to a rental qualification process. The rental qualification process may, in some embodiments, use credit rating information associated with rental applicant 110 and/or a resident associated with a rental unit or group of residents associated with a portfolio of rental units. Third party data sources 120 may provide the credit rating information in some embodiments.

In some embodiments, system 100 may be varied or adapted to meet the particular requests for information from QD 115, a property owner, or rental applicant screener. The responsibilities and functionality of QD 115 may be varied to include all or only certain aspects of verifying and determining a predictive indicator of the qualifications of rental applicant 115 regarding the rental of a real estate rental unit.

QD 115 may communicate directly or indirectly with rental portfolio data 125, third party data sources 120, and rental applicant 110. Rental portfolio database 125 may include information related to a portfolio of real estate properties corresponding to the subject rental unit. Preferably, rental portfolio database 125 includes real world, actual data, as opposed to calculated or theoretical projections. For example, rental portfolio database 125 may include a record of actual rental payments associated with residents of a portfolio of rental units.

While a connection is shown between the various entities in FIG. 1, it should be appreciated that communication between QD 115, rental applicant 110, rental portfolio data 125, and third party data sources 120 may be provided on an as-needed or other less than constant basis.

QD 115 may be, use or access a single device or computer, a networked set or group of devices or computers, a workstation, a server, etc. In some embodiments, QD 115 may implement or host a Web site, database, or other electronically accessible resource for purposes of implementing some embodiments described herein and for providing qualification information.

Figure 2:
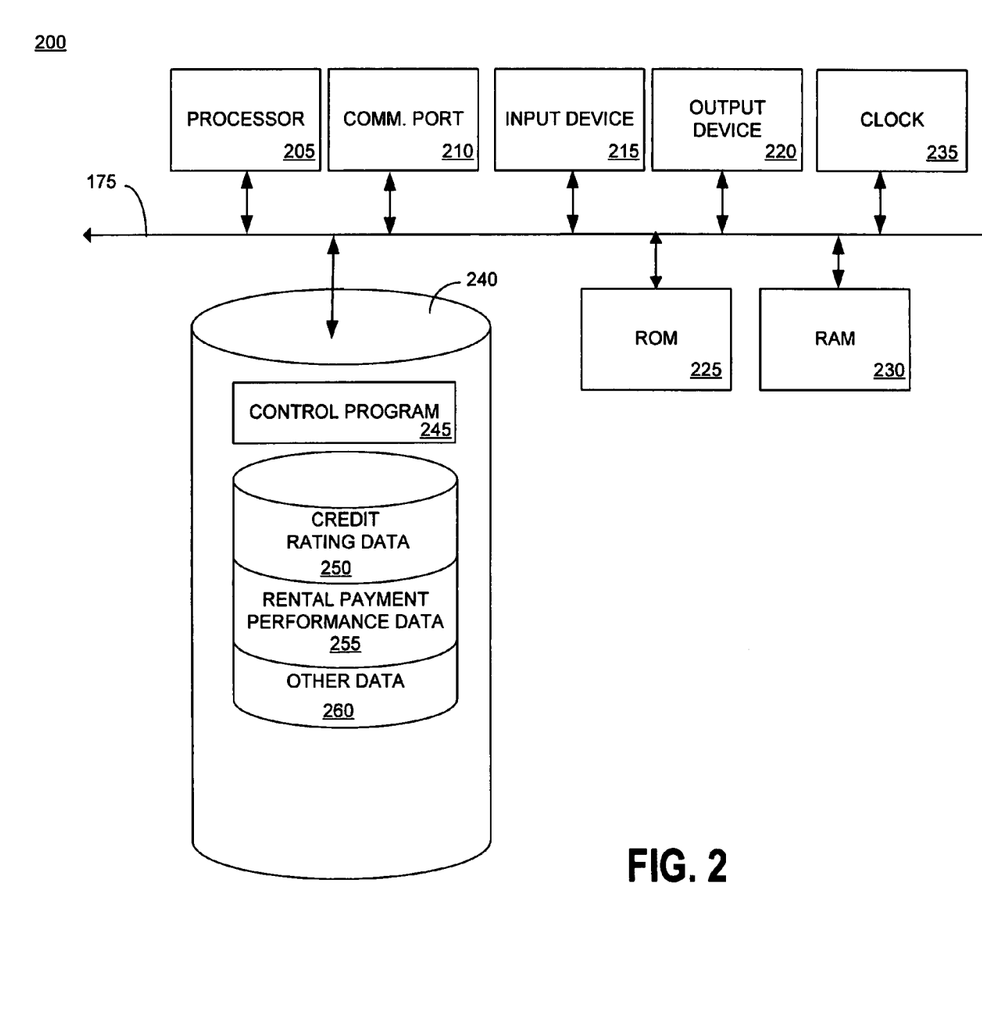
FIG. 2 is an illustrative depiction of an apparatus, in accordance with some embodiments herein.

Referring to FIG. 2, a representative block diagram of a device that may be used by QD 115 is illustrated, generally represented by reference number 200. Apparatus 200 may include a processor, a microchip, a central processing unit, or a computer 205 that is in communication with or otherwise uses or includes one or more communication ports 210 for communicating with other devices. Communication ports 210 may include, for example, local area network adapters, wireless communication devices, Bluetooth® technology, etc. to provide an interface to, for example, network 105.

In some embodiments, device 200 may include one or more input devices 215 (e.g., a bar code reader or other optical scanner, infrared or other receiver, antenna, magnetic stripe reader, image scanner, roller ball, touch pad, joystick, touch screen, microphone, computer keyboard, computer mouse, etc.), as well as one or more output devices 220 (e.g., a printer, infrared or other transmitter, antenna, audio speaker, display screen or monitor, text to speech converter, etc.). Device 200 may include Random Read-Only Memory (ROM) 225 and Random Access Memory (RAM) 230.

In some embodiments, device 200 acts as a server or at least includes functionality of a server to determine a predictive indicator for facilitating a determination of a qualification of rental applicant 110, in accordance with various aspects of the disclosure herein. Device 200 may include a memory or data storage device 240 to store information, software, databases, communications, device drivers, reports, inquiries, service requests, etc. Memory or data storage device 240 preferably comprises an appropriate combination of magnetic, optical and/or semiconductor memory, and may include, for example, ROM, RAM, a tape drive, flash memory, a floppy disk drive, a compact disc and/or a hard disk, etc.

Processor 205 and data storage device 240 may each be, for example, located entirely within a single computer or other computing device, or connected to each other by a remote communication medium, such as a serial port cable, telephone line, or radio frequency transceiver. In some embodiments, device 200 may include or comprise one or more computers that are connected to a remote server computer for maintaining databases or may maintain and control databases such as, for example, a credit rating database 250, a rental payment performance database 255, and other information stores 260.

In some embodiments, a conventional personal computer or workstation with sufficient memory and processing capability may be used as device 200. Device 200 may also include other machines such as a personal digital assistant (PDA), a notebook computer, a smartphone, and other devices, including multimedia processing devices. In some embodiments, device 200 may provide, host, operate, or implement an electronically accessible resource. For example, device 200 may operate as or include a Web site or database server for an Internet environment. The Web site or database may be accessible to rental applicants. For example, a rental applicant may initiate a rental application for a particular rental unit via device 200. In some embodiments, the rental applicant may initiate the qualification process in order to be considered qualified for a number of specific rental units or classes of rental units.

In some embodiments, device 200 is capable of high volume transaction processing, performing a significant number of mathematical calculations in processing communications and database searches. In some embodiments, processor 205 may comprise one or more microprocessors, computers, computer systems, co-processors, etc.

Software may be resident and operating or operational on device 200. The software may be stored on the data storage device 240 and may include a control program 245 for operating device 200, databases, etc. Control program 245 may control processor 205. Processor 205 preferably performs instructions of control program 245, and thereby operates in accordance with the present disclosure, and particularly in accordance with the methods described herein. Control program 245 may be stored in a compressed, uncompiled and/or encrypted format. Control program 245 may include program elements that may be used, such as an operating system, a database management system, and device drivers, for providing processor 205 to interface with peripheral devices, databases, etc. Appropriate program elements are known to those skilled in the art, and need not be described in detail herein.

Device 200 may access, include or store information regarding credit rating and rental payments for rental residents and potential rental residents (e.g., rental applicants 110) and financial transactions executed thereby. For example, credit rating data associated with a credit worthiness or credit score of rental applicant 110 may be stored in credit rating database 250 for use by QD 200 or another device or entity. Information regarding actual, real-world payment performance for one or more rental properties associated with residents of a portfolio of rental units corresponding to the subject rental unit may be stored in rental payment performance database 255 for use by device 200 or another device or entity. The subject rental unit may be a rental unit that is subject to rental by rental applicant 110.

Information in rental payment performance database 255 may include an indication or representation of actual payments received for payment for one or more properties associated with the residents thereof. In some embodiments, the actual rental payment information in rental payment performance database 255, includes, for example, amounts paid, when paid relative to a due date, how many days late (if any), address of the real estate property associated with the responsible residents (e.g., street address, building number, apartment number, etc.), a credit rating for the residents of the portfolio of rental units corresponding to the rental unit. In some embodiments, some or all of the databases herein may be stored or mirrored remotely from device 200.

According to some embodiments of the present disclosure, instructions of control program 245 may be read into a memory from computer-readable medium, such as from ROM 225 to RAM 230. Execution of sequences of the instructions in the control program may cause processor 205 to perform the process steps and operations described herein.

In some embodiments, hard-wired circuitry may be used in place of, or in combination with, software instructions for implementation of some or all of the methods of the present disclosure. Thus, the various embodiments herein are not limited to any specific combination of hardware and software.

Processor 205, communication port 210, input device 215, output device 220, ROM 225, RAM 230, clock 235, and data storage device 240 may communicate or be connected, directly or indirectly, in a variety of ways. For example, processor 205, communication port 210, input device 215, output device 220, ROM 225, RAM 230, clock 235, and data storage device 240 may be connected via a bus 265.

While specific implementations and hardware configurations for device 200 have been illustrated, it should be noted that other implementations and hardware configurations are possible and that no specific implementation or hardware configuration is required. Thus, not all of the components illustrated in FIG. 2 may be needed for or included in a device implementing the methods disclosed herein. Therefore, many different types of implementations or hardware configurations can be used in system 200 and the methods disclosed herein are not limited to any specific hardware configuration.

Figure 3:
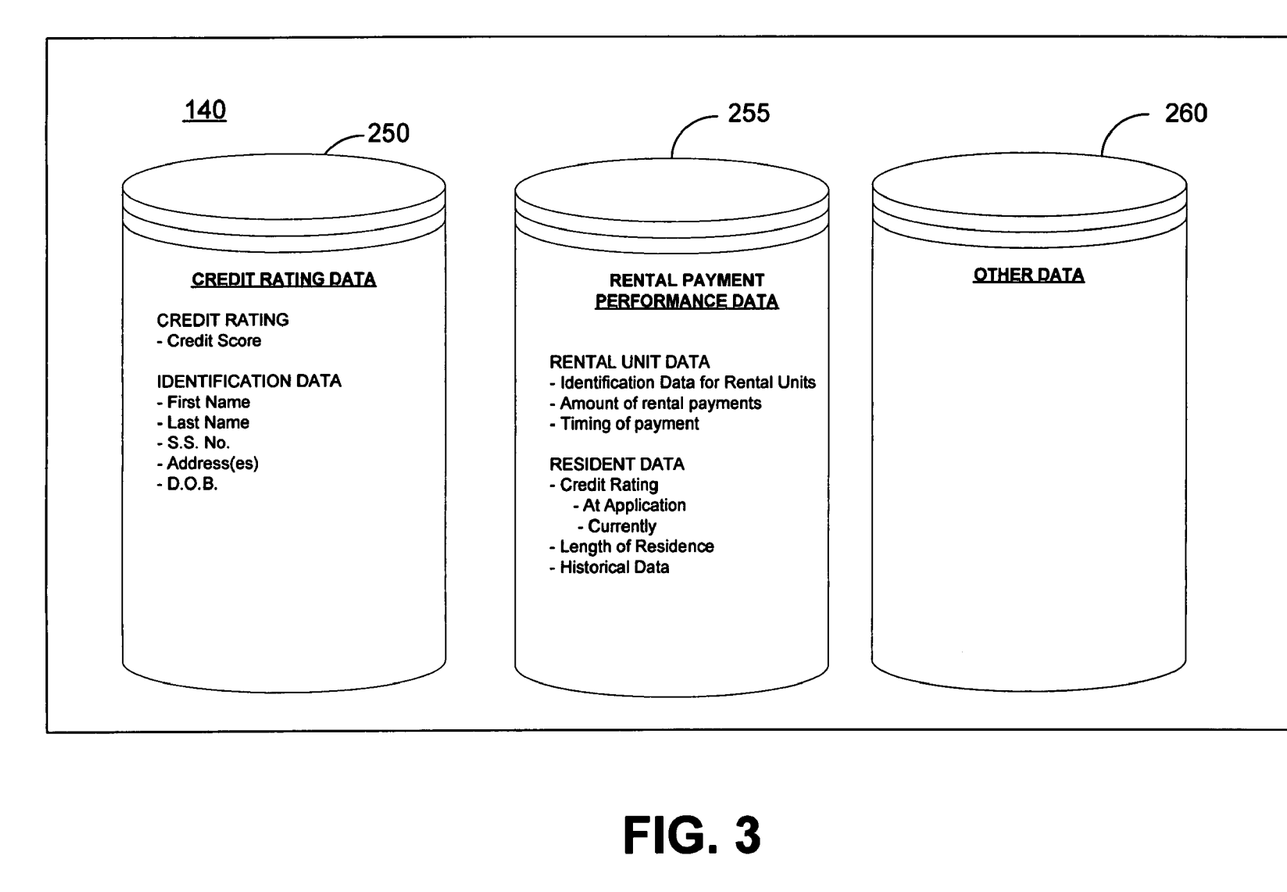
FIG. 3 is an exemplary illustration of a number of databases of FIG. 2.

A number of databases 250, 255, and 260 are depicted in FIG. 3 and collectively referenced by numeral 300. As mentioned above, in some embodiments herein a QD 115, 200 or other device or entity may access a storage device (e.g., storage device 240) that may include one or more databases for storing or accessing information regarding credit ratings and rental payment performance information.

Credit rating database 250 may include credit rating information associated with a rental applicant. In particular, credit rating database 250 may provide credit rating information that, preferably, indicates or conveys a level of risk associated with rental applicant regarding satisfactory fulfillment of financial obligations based on historical data. For example, credit rating database 250 may include a credit rating, codes, or other identifiers representative of a credit rating worthiness of rental applicant 110. In some embodiments, credit rating database 250 may include identifying information associated with rental applicant 110. For example, the rental applicant's name (e.g., first, last, and former names), social security number or other identifiers, a historical record of residential addresses for the rental applicant, date of birth, and other historical information. Some of the other credit worthiness information may include court documents such as, for example, number and/or type of court proceedings in which rental applicant 110 was an interested part, criminal records, and other historical information associated with the rental applicant that may be deemed relevant to determinations herein.

It should be appreciated that in some embodiments herein, the information stored in or accessed by credit rating database 250 provides objective criteria and information that may be used in further determination, analysis, and decision-making aspects regarding the processes herein.

Rental payment performance database 255 may include actual payment information associated with residents of a portfolio of rental units corresponding to a rental unit that may be subject to the rental application of rental applicant 110. Records in rental payment performance database 255 may include, but not be limited to, rent payment performance for one or more residents responsible or obligated for providing rental payments for the portfolio of rental units. The records of rent payment performance may, in some embodiments, include more than an indication of whether a rent payment was received for a corresponding rental unit. In some embodiments, an indication of rent payment performance may include an indication of when the payment was received relative to a due date (e.g., on time, late, number of days late, etc.); an amount of rent paid; an indication of the real estate property associated with actual rent payments, including, for example, city, state, zip code, apartment number; number of months in residence at the real estate property, number or percentage of months rent payments were made on time; etc.

Additionally, rental payments database 255 may include a credit score, credit rating, or other information indicative or representative of the resident's credit rating. In some embodiments, the included credit score, credit rating, or other information indicative or representative of the resident's credit rating may be representative of the resident's credit rating at the time the resident initially became responsible for making the rental payments (e.g., at the time an initial lease or rental agreement was executed). In some embodiments, the credit rating may be indicative of the resident's credit rating at a later period of time (e.g., updated or currently).

Rental payment performance database 255 may further include information associated with or representative of the (actual) credit rating level of the residents or other entities responsible for making the payments for the real estate properties included in the rental payment performance database 255. The credit rating information associated with the residents or entities responsible for making the payments for the real estate properties included in the rental payment performance database 255 may include an indication of the credit rating of the responsible renters at the time the associated real estate properties were initially rented and/or the current (i.e., updated) credit rating of the responsible renters. The updated credit rating information may be particularly relevant for renters still under an obligation (e.g., obligated by a rental lease agreement or other contract) to make rent payments for the real estate properties in rental portfolio database 255.

Database 260 may be provided to store additional information or temporarily store information indicated as being (primarily) stored in memory mechanisms 250 and 255. In some embodiments, database 260 may provide supplementary or back-up storage capacity for databases 250 and 255.

Figure 4:
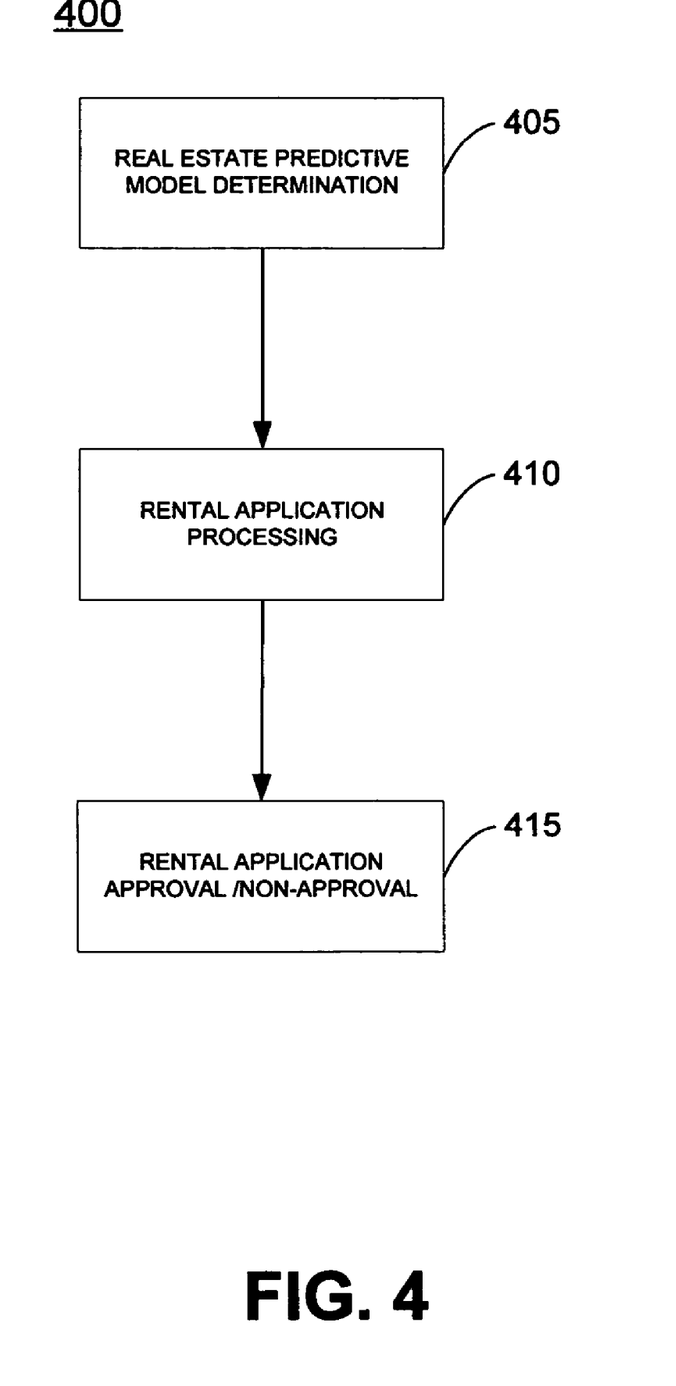
FIG. 4 is an exemplary flow diagram of an overall process, in accordance with some embodiments herein.

Referring to FIG. 4, an exemplary process 400, in accordance with some embodiments of the present disclosure, is illustrated. Process 400 includes determining a predictive indicator regarding a real estate rental at operation 405. Operation 405 may be implemented, in some embodiments, using QD 115, 200, another device or system, and a computer-readable storage medium. Operation 405 may access or make use of credit rating data, rental payment performance data, and other information in the process of determining the predictive indicator regarding a real estate rental.

Operation 405 may be accomplished at the request, direction, or control of a real estate broker, a real estate manger or management company, and others.

The predictive indicator of operation 405 associated with a portfolio of rental units may be received at operation 410. Operation 410 includes processing of a rental application for a particular subject rental unit. In some embodiments, the subject rental unit is included in the portfolio of rental units considered in operation 405. In some embodiments, the subject rental unit is not included in the portfolio of rental units considered in operation 405. Preferably, the subject rental unit corresponds with the rental units in the portfolio of rental units considered in operation 405 such that the predictive indicator is a relevant and valid predictive tool regarding the subject rental unit and the rental application processing of operation 410. The predictive indicator of operation 405 may be relevant and valid regarding the subject rental unit and the rental application processing of operation 410 because, at least, the predictive indicator of operation 405 is based on actual rental performance data for the portfolio of rental units that correspond to the subject rental unit.

The rental application may be received via network 105, either directly or indirectly, directly from a rental applicant, a real estate broker, an employer of a potential renter, and any other entity that may be responsible for payment of rent, lease, and other financial obligations related to a real estate property.

Operation 415 may include further actions that may be invoked or initiated in response to the predictive indicator of operation 405 and the rental application processing of operation 415. Operation 415 may include, at least, an approval/non-approval decision and actions based on the predictive indicator of operation 405 and the rental application processing of operation 415. Other actions such as, for instance, moving and welcoming activities, may be included in operation 415. Another course of action may be the further processing of the rental application or a termination of any further processing of the rental application. Thus, operation 415 may include an application approval and non-approval processing as indicated.

In some embodiments, the real estate predictive model determination of operation 405 and the rental application processing of operation 410 may be accomplished, at least in part, by a QD. The QD for processing of the rental application may be similar to the exemplary QD 115 and 200 depicted in FIGS. 1 and 2, respectively. However, as stated herein regarding FIGS. 1 and 2, the particular implementation of the QD may be varied, depending, at least, on a function and scope of application of the QD.

In some aspects herein, QD 115, 200 at 410 operates to determine a predictive indicator regarding rental unit(s) (e.g., operation 405) to facilitate a determination of a qualification of a real estate rental applicant regarding a particular rental unit (e.g., operation 410).

Figure 5:
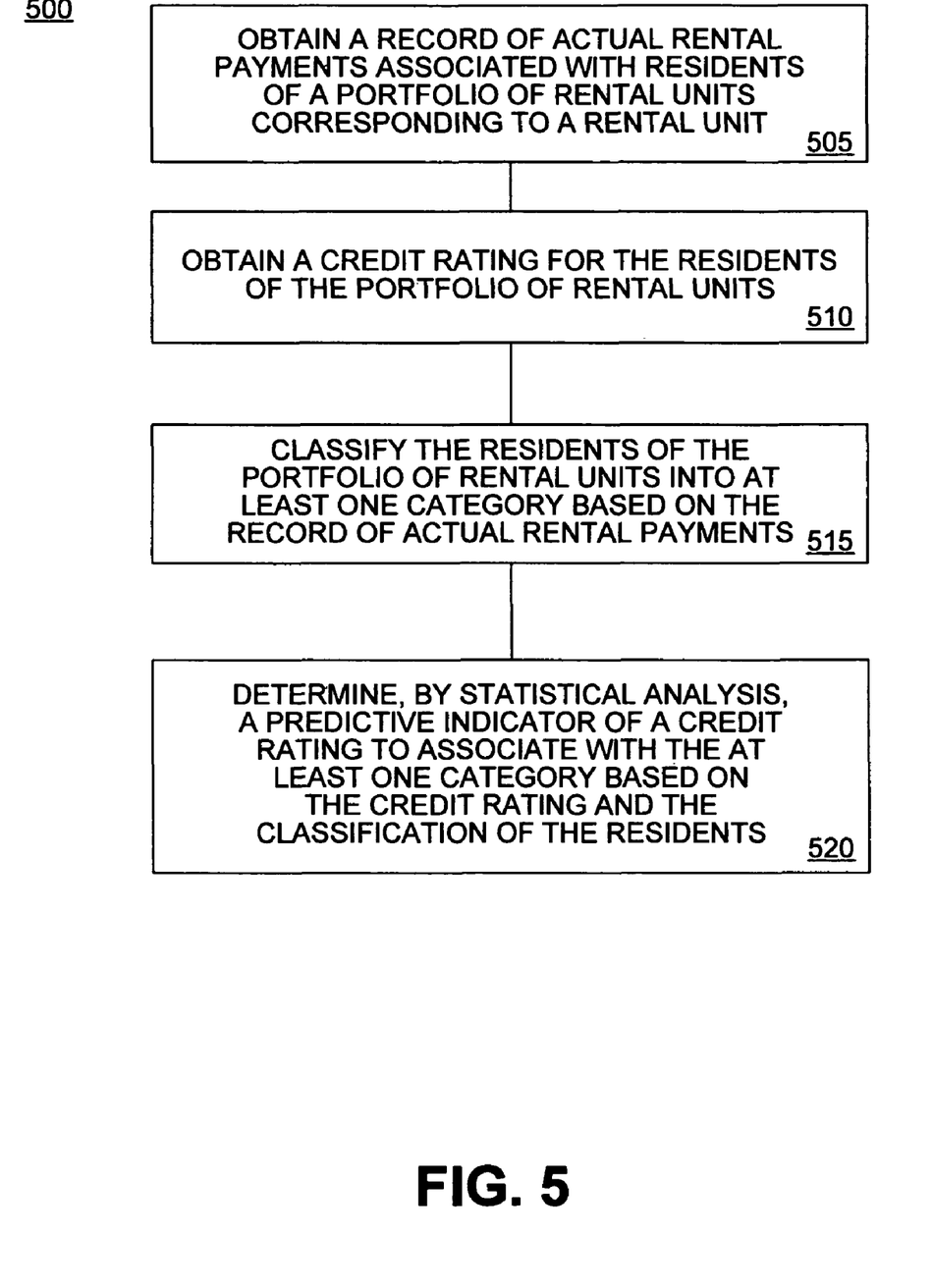
FIG. 5 is an exemplary flowchart of a process, in accordance with some embodiments herein.

FIG. 5 shows an exemplary flow diagram of a process 500 for, inter alia, determining a predictive indicator of a credit rating to associate with a portfolio of rental units. The predictive indicator may be used to facilitate a determination of the qualifications of a real estate rental applicant, according to some embodiments herein. Process 500 may start at operation 505 to obtain a record of actual rental payments associated with residents of a portfolio of rental units corresponding to a (subject) rental unit. The portfolio of rental units may correspond to the rental unit on the basis of similarities and comparable associations common to the portfolio of rental units and the rental unit.

The portfolio of corresponding real estate properties may include, for example, rental units having comparable location, size, amenities, and other attributes as the subject rental unit.

A leasing agent, property management company, property owner, or service provider may assign or determine the real estate properties to include in the portfolio of corresponding properties. In some instances, all of the properties commonly owned by a single entity (e.g., person, corporation, group of people, etc.) may be classified as corresponding properties while in some instances a subset of the properties commonly owned by the real estate owner are included in the portfolio of corresponding properties.

At operation 510, a record of a credit rating for the residents of the portfolio of rental units is obtained. In some embodiments, the credit rating for the residents of the portfolio of rental units may be provided as part of the record of actual rental payments. In some embodiments, the credit rating of the residents of the portfolio of rental units may be provided in a record other than the record of actual rental payments. The credit rating information for the residents of the portfolio of rental units may be indicative of a credit rating associated with the residents at the time they initiated renting the rental units (and, in some embodiments, at a later time (i.e., updated credit ratings).

The record of actual rent payments for the portfolio of rental units may include an indication of when a rent payment was received relative to a due date, the amount of rent received, the number of days the rent payment was late relative to the due date, the address associated with the rent payments.

The record of actual rental payments may be received, accessed, or requested from a variety of data sources. The data sources may include, for example, memory storage mechanisms of QD 115, 200 and third party data sources 120. Third party data sources 120 may include an information or service provider that compiles, aggregates, processes, or stores the actual rental payment information or portions thereof.

At operation 515, a classification of the residents of the portfolio of rental units is performed based on the record of actual rental payments. The residents of the portfolio of rental units may be classified into at least one category of resident or renter. That is, based on the actual performance of the residents regarding rental payments, the residents for the portfolio of rental units are classified into at least one category or resident or renter.

Categories of resident or renter may include, in some embodiments, a "Good" category, a "Bad" category, and an "O.K." category. For example, an actual rental payment record (i.e., actual exhibited behavior) indicating a 96% on-time payment may be used to classify a resident as a "Good" resident. In an instance a 90% on-time payment was determined to be O.K. (e.g., O.K. if certain conditions are met), then those residents that actually exhibited a behavior of paying rent on-time 90% of the time could be classified as "O.K." residents. Further, in the instance, for example, a 85% or less on-time payment was determined to be unacceptable (e.g., bad), then those residents that actually exhibited the behavior of paying rent on-time less that 85% of the time could be classified as "Bad" residents.

It should be appreciated that fewer or more categories may be used, being labeled differently than the three exemplary categories discussed herein above.

The actual rental payment data may provide insight into a payment performance for the portfolio of corresponding rental units for the subject rental unit since the actual payments received for payment are obtained at operation 505 and used at operation 510. The record of actual rental payments for the portfolio of corresponding real estate properties includes actual, factual data regarding the rent payments for portfolio of corresponding properties over a period of time. The period of time may correlate to, for example, the twelve (12) months, six (6) months, eighteen (18) months, and other periods of time. The period of time may be varied in some embodiments herein. Also, the period time may be predetermined before process 500 or as part of process 500.

At operation 520, a determination is made, using statistical analysis, to associate with the at least one category based on the credit rating and the classification of the residents. In particular, the statistical analysis is performed to determine a predictive indicator of a credit rating to associate with the at least one category based on the credit rating and the classification of the residents. The determination of operation 520 is based actual performance and behavior data (i.e., the rental payment data and resident credit ratings).

In some embodiments, the predictive indicator may be expressed as a probability of the type of resident that a resident or potential resident (i.e., a rental applicant) having a specific credit rating will correlate to. That is, operation 520 may provide a predictive indicator of what category of classification an entity with a certain credit rating will be, such as, for example, a "Good", "Bad", or "O.K." renter. The statistical analysis may include a number and variety of statistical operations, including but not limited to, a logistical linear regression operation. The predictive indicator may be provided in the form of a table, chart, graph, and other presentation formats.

Figure 6:
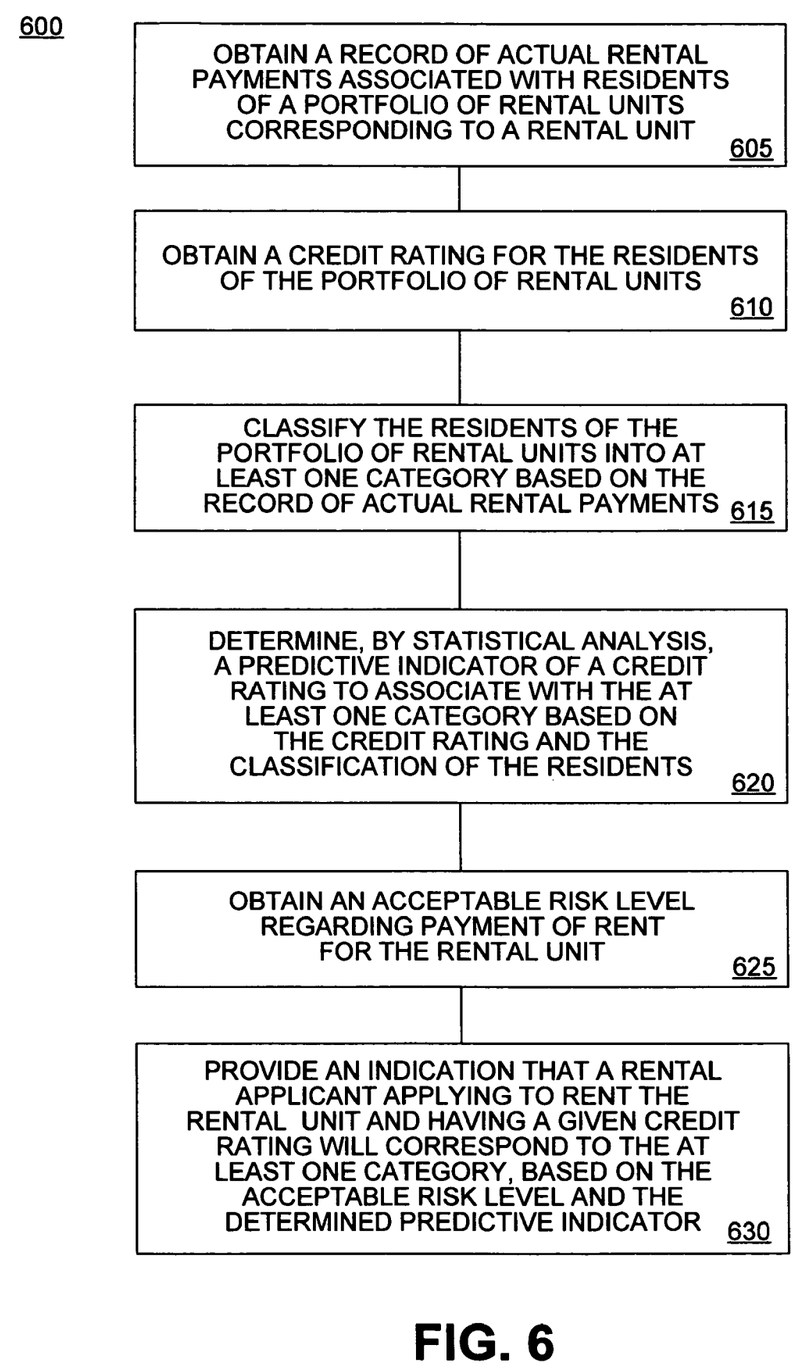
FIG. 6 is another exemplary flowchart of a process, in accordance with some embodiments herein.

FIG. 6 illustrates an exemplary process 600 that is similar in some aspects to FIG. 5. Particularly, operations 605, 610, 615, and 620 may be similar to operations 505, 510, 515, and 520 discussed above. Accordingly, a detailed discussion of operations 605, 610, 615, and 620 is not provided herein. FIG. 6 provides operations 625 and 630 that may be used to determine a qualification of a rental applicant.

At operation 625, an acceptable risk level regarding payment of rent for the subject rental unit is obtained. In some aspects, the acceptable risk level may be based on a number of factors, including real estate market criteria, a performance of a portfolio of rental units (and subsets thereof), a comfort level of a real estate property owner or manager, and other considerations. In some embodiments, the acceptable risk level is determined and quantified. Such a determined and quantified acceptable risk facilitates a practical and repeatable method for determining an indication a qualified rental applicant.

The acceptable risk level for the rental unit may be indicative of an amount of risk the rental unit's owner or managing entity is willing to accept (i.e., assume) regarding non-payment of rent during a rental period (i.e., lease) for the rental unit to the rental applicant. That is, in some embodiments, the acceptable risk level will provide an indication of a level of exposure to non-payment of rent the rental unit owner or managing entity is willing to accept. In some instances, the acceptable risk level may represent a maximum amount of exposure the owner or rental manager is willing, comfortable, or prepared to take.

In some embodiments, a plurality of acceptable risk levels may be obtained or determined. The multiple acceptable risk levels may be determined in order to, for example, evaluate the consequences of using different acceptable risk levels, in accordance with other aspects herein. For example, one or more acceptable risk levels regarding payments for the subject rental unit may be obtained. A first acceptable risk level may relate to a 80% on-time rent payment performance, a second acceptable risk level may relate to a 70% on-time rent payment performance, and a yet another acceptable risk level may relate to a 60% on-time rent payment. In some embodiments, the acceptable risk level may be varied independent of the predictive indicator determined in process 500 and operation 620.

Operation 630 includes, at least in some embodiments, providing an indication that a rental applicant applying to rent the rental unit and having a given credit rating will correspond to the at least one category. The provided indication is based on the acceptable risk level (i.e., operation 625) and the determined predictive indicator (i.e., operation 620). Accordingly, process 600 may be used to facilitate a determination of the qualifications of the rental applicant. In this manner, a rental applicant may be deemed acceptable or unacceptable according to a reliable and repeatable process. The process may be considered reliable and repeatable based on the actual performance data (e.g., actual rental payments and credit rating) used.

Further operations may be included or performed in accordance with the present disclosure. For example, an indication of a qualification of the rental applicant to rent the rental unit may be provided. In some aspects, a qualification for the rental applicant may be determined or provided by comparing a credit rating of the rental applicant and the determined predictive indicator (operation 520, 620). Also, the qualification for the rental applicant may include a plurality of levels of qualification where, in some embodiments, each level of the plurality of levels of qualification corresponds to a level of the at least one classification. Furthermore, the plurality of levels of qualification may include an acceptable level, an unacceptable level, and an acceptable with conditions level.

In some embodiments, an indication of a credit rating regarding rental applicant 110 is provided. Credit rating data may include, for example, a brief listing or summary of identifying indicia regarding rental applicant 110. For example, the credit rating data may include objective data related to rental applicant 110 such as, for example, a credit rating from one or more credit rating/reporting source, an account of court proceedings (civil and/or criminal) associated with the rental applicant, the rental applicant's name (e.g., first, last, and former), a social security number or other identifying indicia such as a state driver's license number, a passport or other identification identifier, a date of birth for rental applicant 110, and any combinations thereof.

A rental application including credit rating data associated with rental applicant 110 may be obtained from a number of sources, including credit rating database 250, a website, an electronic submission of a file or brief (e.g., limited information such as name, current address or date of birth) identifiers, a paper application, a voice recording or request, and other known or developed data acquisition techniques and methods.

The credit rating data preferably includes sufficient codes, fields, or identifiers to convey a reliable identification of the rental applicant. The credit rating data may include a credit rating or score that may be based on such information as, for example, the record of court proceedings, the rental applicant's name, the social security number or other identifying indicia for rental applicant 110, the rental applicant's date of birth, and combinations thereof.

In some embodiments, the credit rating data may only include enough information to determine a minimum or threshold qualification of the rental applicant. Though brief, it will be appreciated that the methods herein can provide reliable determinations of the qualifications of a rental applicant using, in some embodiments, brief rental applicant identifying data in an efficient manner.

It should be appreciated that the period or span of time for which payment information is used may vary based on a number of factors, including but not limited to, market conditions, demographics, and financial indicators.

Further, the indication of whether the rental applicant is qualified to rent the subject rental unit may be expressed as an alpha-numeric value. The alpha-numeric representations may be expressed on a scale relative to other such alpha-numeric representations. In some embodiments, the indication of whether the rental applicant is qualified may be expressed at a number of different qualification levels such as, for example, approved, approved with conditions, not approved, and other possible levels. The indication of whether rental applicant 110 is qualified may be used in further processing steps relying thereon such as, for example, generation of reporting letters to rental applicant 110 with respect to the determination of whether rental applicant 110 is qualified to rent the rental unit.

In some embodiments, an indication of whether the rental applicant is qualified to rent the rental unit or, at least, further processing of the rental application, may be communicated to rental applicant 110 and the leasing agent or property management entity. In some embodiments, QD 115 and 200 may receive the indication. QD 200, for example, may store an indication in a database or memory mechanism such as database 260.

In accordance with some embodiments herein, a real estate rental applicant having similar credit rating attributes as residents of real estate included in a portfolio of real estate corresponding to the rental applicant's subject rental unit are used to determine a probability that the rental applicant will (or will not pay) rent due in a timely manner.

In some embodiments, methods of the present disclosure may be embodied as an executable computer program or instructions. The methods or embodiment thereof in computer executable instructions may however be implemented in many different ways, using any of a number of programming techniques and programming languages executable by general-purpose hardware systems or dedicated controllers. Also, at least some of the various steps for the methods described herein are optional or can be combined or performed in one or more alternative orders or sequences without departing from the scope of the present disclosure. Accordingly, the present disclosure and the appended claims should not be construed as being limited to any particular order or sequence, unless specifically indicated.

Each of the methods described above may be performed on a single computer, computer system, microprocessor, services, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present disclosure has been described with respect to various embodiments thereof, those skilled in the relevant art will note that various substitutions may be made to those embodiments described herein without departing from the spirit and scope of the present disclosure.

What is claimed is:

1. A computer-implemented method comprising:
   obtaining a historical record of actual rental payments associated with residents of a portfolio of rental units including a subject rental unit, the portfolio of rental units corresponding to the subject rental unit based on one or more associations common to both the portfolio of rental units and the subject rental unit and the historical record of actual rental payments includes an indication of when the rent payments were received relative to a due date for each of the rental units in the portfolio of rental units and comprises at least one of: identifying information for a rental unit in the portfolio of rental units, a length of time a resident of the portfolio of rental units has resided in a rental unit included in the portfolio of rental units, and historical data associated with a resident of the portfolio of rental units;

obtaining a credit rating for each of the residents of the portfolio of rental units;

classifying each of the residents of the portfolio of rental units into at least one category based solely on the record of actual rental payments including the indication of when the rent payments were received relative to the due date for each of the rental units in the portfolio of rental units;

determining, by statistical analysis using a computer, a predictive indicator of a credit rating to associate with the at least one category based on the credit rating and the classification of the residents based on when the rent payments were received relative to the due date for each of the rental units in the portfolio of rental units, wherein the statistical analysis comprises a logistical linear regression operation;

obtaining an acceptable risk level regarding payment of rent for the subject rental unit, wherein the acceptable risk level is varied independent of the predictive indicator;

providing an indication that a rental applicant applying to rent the subject rental unit and having an associated credit rating will correspond to the at least one category, based on the acceptable risk level and the determined predictive indicator; and storing the indication that a rental applicant applying to rent the subject rental unit and having an associated credit rating will correspond to the at least one category in a memory.

2. The method of claim 1, wherein the provided indication is expressed as a probability.

3. The method of claim 1, further comprising determining a qualification for the rental applicant by comparing the associated credit rating of the rental applicant and the determined predictive indicator.

4. The method of claim 3, wherein the qualification for the rental applicant comprises a plurality of levels of qualification and each level of qualification corresponds to a level of the at least one classification.

5. The method of claim 4, wherein the plurality of levels of qualification comprises an acceptable level, an unacceptable level, and an acceptable with conditions level.

6. The method of claim 1, further comprising updating the predictive indicator by using an updated record of the actual rental payments in the classifying of the residents of the portfolio of rental units.

7. The method of claim 1, wherein the record of actual rental payments is associated with a predetermined period of time and the credit rating for the residents is a credit rating associated with the residents at a beginning of the predetermined period of time.

8. The method of claim 1, further comprising providing a recommended course of action based on the predictive indicator.

9. A system for facilitating a determination of a qualification of a rental applicant, comprising:
a memory; and
a processor connected to the memory, the processor being operative to:
obtain a historical record of actual rental payments associated with residents of a portfolio of rental units including a subject rental unit, the portfolio of rental units corresponding to the subject rental unit based on one or more associations common to both the portfolio of rental units and the subject rental unit and the historical record of actual rental payments includes an indication of when the rent payments were received relative to a due date for each of the rental units in the portfolio of rental units and comprises at least one of: identifying information for a rental unit in the portfolio of rental units, a length of time a resident of the portfolio of rental units has resided in a rental unit included in the portfolio of rental units, and historical data associated with a resident of the portfolio of rental units;

obtain a credit rating for each of the residents of the portfolio of rental units;

classify each of the residents of the portfolio of rental units into at least one category based solely on the record of actual rental payments including the indication of when the rent payments were received relative to the due date for each of the rental units in the portfolio of rental units;

determine, by statistical analysis, a predictive indicator of a credit rating to associate with the at least one category based on the credit rating and the classification of the residents based on when the rent payments were received relative to the due date for each of the rental units in the portfolio of rental units, wherein the statistical analysis comprises a logistical linear regression operation;

obtain an acceptable risk level regarding payment of rent for the subject rental unit, wherein the acceptable risk level is varied independent of the predictive indicator;

provide an indication that a rental applicant applying to rent the subject rental unit and having an associated credit rating will correspond to the at least one category, based on the acceptable risk level and the determined predictive indicator;

and store the indication that a rental applicant applying to rent the subject rental unit and having an associated credit rating will correspond to the at least one category in a memory.

10. The system of claim 9, wherein the provided indication is expressed as a probability.

11. The system of claim 9, wherein the processor is further operative to: determine a qualification for the rental applicant by comparing the associated credit rating of the rental applicant and the determined predictive indicator.

12. The system of claim 11, wherein the qualification for the rental applicant comprises a plurality of levels of qualification and each level of qualification corresponds to a level of the at least one classification.

13. The system of claim 9, further comprising updating the predictive indicator by using an updated record of the actual rental payments in the classifying of the residents of the portfolio of rental units.

14. The system of claim 9, wherein the record of actual rental payments is associated with a predetermined period of time and the credit rating for the residents is a credit rating associated with the residents at a beginning of the predetermined period of time.

15. A storage medium having executable programming instructions stored thereon, the stored program instructions comprising:
instructions to obtain a historical record of actual rental payments associated with residents of a portfolio of rental units including a subject rental unit, the portfolio of rental units corresponding to the subject rental unit based on one or more associations common to both the portfolio of rental units and the subject rental unit and the historical record of actual rental payments including an indication of when the rent payments were received relative to a due date for each of the rental units in the portfolio of rental units and comprises at least one of: identifying information for a rental unit in the portfolio of rental units, a length of time a resident of the portfolio of rental units has resided in a rental unit included in the portfolio of rental units, and historical data associated with a resident of the portfolio of rental units;

instructions to obtain a credit rating for each of the residents of the portfolio of rental units;

instructions to classify each of the residents of the portfolio of rental units into at least one category based solely on the record of actual rental payments including the indication of when the rent payments were received relative to the due date for each of the rental units in the portfolio of rental units;

instructions to determine, by statistical analysis, a predictive indicator of a credit rating to associate with the at least one category based on the credit rating and the classification of the residents based on when the rent payments were received relative to the due date for each of the rental units in the portfolio of rental units, wherein the statistical analysis comprises a logistical linear regression operation;

instructions to obtain an acceptable risk level regarding payment of rent for the subject rental unit, wherein the acceptable risk level is varied independent of the predictive indicator;

instructions to provide an indication that a rental applicant applying to rent the subject rental unit and having an associated credit rating will correspond to the at least one category, based on the acceptable risk level and the determined predictive indicator; and storing the indication that a rental applicant applying to rent the subject rental unit and having an associated credit rating will correspond to the at least one category in a memory.

16. The storage medium of claim 15, further comprising instructions to determine a qualification for the rental applicant by comparing the associated credit rating of the rental applicant and the determined predictive indicator.

17. The storage medium of claim 15, wherein the qualification for the rental applicant comprises a plurality of levels of qualification and each level of qualification corresponds to a level of the at least one classification.

* * * * *